(12) United States Patent
Kopsie et al.

(10) Patent No.: US 10,473,147 B2
(45) Date of Patent: Nov. 12, 2019

(54) SOCKET ASSEMBLY AND METHOD OF MAKING A SOCKET ASSEMBLY

(71) Applicant: Federal-Mogul Motorparts Corporation, Southfield, MI (US)

(72) Inventors: Eric M. Kopsie, Bethalto, IL (US); Glen C. Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 1 day.

(21) Appl. No.: 15/070,363

(22) Filed: Mar. 15, 2016

(65) Prior Publication Data

US 2017/0268564 A1    Sep. 21, 2017

(51) Int. Cl.
F16C 11/06     (2006.01)

(52) U.S. Cl.
CPC ........ F16C 11/0628 (2013.01); F16C 11/068 (2013.01); F16C 11/0685 (2013.01)

(58) Field of Classification Search
CPC ..... Y10T 403/32713; Y10T 403/32721; Y10T 403/32737; Y10T 403/32762; Y10T 403/32786; Y10T 403/32803; Y10T 403/32811; F16C 11/0628; F16C 11/0642; F16C 11/0666; F16C 11/0671; F16C 11/068; F16C 11/0685; F16C 11/086
USPC ........ 403/132, 133, 135, 138, 141, 143, 144
See application file for complete search history.

(56) References Cited

U.S. PATENT DOCUMENTS

| | | | |
|---|---|---|---|
| 2,494,739 A | 1/1950 | Booth | |
| 2,544,583 A | 3/1951 | Booth | |
| 2,618,049 A | 11/1952 | Flumerfelt | |
| 2,631,044 A | * 3/1953 | Booth | B60G 7/005 280/124.108 |
| 2,846,252 A | 8/1958 | Herbenar et al. | |
| 2,861,827 A | 11/1958 | Langen et al. | |
| 2,880,025 A | * 3/1959 | Herbenar | F16C 11/0604 403/133 |

(Continued)

FOREIGN PATENT DOCUMENTS

| | | |
|---|---|---|
| CH | 297120 A | 3/1954 |
| DE | 857301 C | 11/1952 |
| FR | 1012634 A * | 7/1952 .......... F16C 11/0628 |

OTHER PUBLICATIONS

International Search Report, dated Jun. 7, 2017 (PCT/US2017/021848).
International Search Report, dated Jul. 24, 2019.

*Primary Examiner* — Daniel J Wiley
(74) *Attorney, Agent, or Firm* — Robert L. Stearns; Dickinson Wright, PLLC

(57) ABSTRACT

The socket assembly includes a housing with an inner bore that extends from a closed end to an open end. A ball portion of a ball stud is received in the inner bore. A shank portion projects through the open end. A backing bearing is disposed in the inner bore and is movable in a radial direction relative to the housing. The backing bearing presents a first bearing surface which is in sliding contact with the ball portion. A radial ring with an annular shape is also disposed in the inner bore of the housing and presents a second bearing surface which is in sliding contact with an equator of the ball portion. An exit bearing is in the inner bore, and the exit bearing has a curved third bearing surface that is in sliding contact with an opposite hemisphere of the ball portion from the first bearing surface.

17 Claims, 6 Drawing Sheets

(56) References Cited

U.S. PATENT DOCUMENTS

| | | | | |
|---|---|---|---|---|
| 2,993,717 A * | 7/1961 | Gottschald | | F16C 11/06 403/133 |
| 3,027,182 A | 3/1962 | Reuter | | |
| 3,088,784 A * | 5/1963 | Melton | | F16C 11/0676 384/209 |
| 3,128,110 A | 4/1964 | Herbenar | | |
| 3,343,857 A | 9/1967 | Cislo | | |
| 3,376,058 A | 4/1968 | Herbenar | | |
| 3,722,931 A * | 3/1973 | Uchida | | F16C 11/0619 280/93.508 |
| 3,951,557 A | 4/1976 | Herbenar | | |
| 4,163,617 A * | 8/1979 | Nemoto | | F16C 11/0642 403/132 |
| 4,231,673 A * | 11/1980 | Satoh | | F16C 11/0633 403/125 |
| 4,493,512 A * | 1/1985 | Smith, Jr. | | F16C 11/0652 384/2 |
| 4,875,794 A * | 10/1989 | Kern, Jr. | | F16C 11/086 29/898.044 |
| 5,066,160 A * | 11/1991 | Wood | | B62D 7/166 403/132 |
| 5,154,530 A * | 10/1992 | Dresselhouse | | B62D 7/16 403/138 |
| 5,564,853 A * | 10/1996 | Maughan | | F16C 11/0619 29/441.1 |
| 6,010,271 A | 1/2000 | Jackson et al. | | |
| 6,171,012 B1 * | 1/2001 | Westphal | | F16C 11/0628 403/132 |
| 6,350,075 B1 * | 2/2002 | Abels | | F16C 11/0666 277/635 |
| 6,533,490 B2 | 3/2003 | Kincaid et al. | | |
| 6,695,521 B2 | 2/2004 | Kincaid et al. | | |
| 7,862,250 B2 * | 1/2011 | Kuru | | F16C 11/0666 277/635 |
| 8,678,656 B2 * | 3/2014 | Richter | | F16C 11/0638 384/213 |
| 2006/0171775 A1 * | 8/2006 | McLaughlin | | F16C 11/0614 403/122 |
| 2009/0211390 A1 * | 8/2009 | Brogardh | | B25J 17/0266 74/490.03 |
| 2011/0142534 A1 * | 6/2011 | Brogardh | | F16C 11/0647 403/141 |
| 2014/0205366 A1 * | 7/2014 | Mevorach | | B60G 7/005 403/144 |
| 2017/0350441 A1 | 12/2017 | Parker, Jr. et al. | | |

* cited by examiner

SOCKET ASSEMBLY AND METHOD OF MAKING A SOCKET ASSEMBLY

BACKGROUND OF THE INVENTION

1. Field of the Invention

The present invention is related, generally, to socket assemblies, and more particularly, to socket assemblies for vehicle suspension and steering systems.

2. Related Art

Socket assemblies of the type that are used in vehicle suspension and steering systems typically include a ball stud which is movable relative to a housing. Such socket assemblies typically include one or more bearings that are positioned within the housing and are in sliding contact with a ball portion of the ball stud to facilitate the rotation of the ball stud relative to the housing. The bearings are typically made of either metal or a hard plastic material.

Such socket assemblies are typically either of the radial loaded type, compression loaded type or the tension loaded type, depending on the configuration of the suspension or steering system. In many known types of compression-style socket assemblies, when a radial load is applied to the ball stud, the ball stud will try to walk up the radius of the lower bearing, thereby reducing the surface of contact between the ball stud and the lower bearing. The term lower bearing is interchangeable with the term backing bearing throughout the following description of this invention.

SUMMARY OF THE INVENTION AND ADVANTAGES

One aspect of the present invention is for a socket assembly. The socket assembly includes a housing with an inner bore that extends along an axis from a wall at a generally closed first end to an open second end. The socket assembly further includes a ball stud with a ball portion that is received in the inner bore of the housing and a shank portion which projects out of the inner bore through the open second end. A backing bearing is disposed in the inner bore and is movable in a radial direction relative to the housing. The backing bearing presents a curved first bearing surface which is in sliding contact with an outer surface of the ball portion of the ball stud. A radial ring with an annular shape is also disposed in the inner bore of the housing. The radial ring presents a second bearing surface which is in sliding contact with an equator of the ball portion. The socket assembly further includes an exit bearing which is made as a separate piece from the radial ring and which has a curved third bearing surface that is in sliding contact with an opposite hemisphere of the ball portion from the first bearing surface.

During operation, the floating (movable) backing bearing and the radial ring support loads independently of one another. Specifically, the radial ring supports all or substantially all of the radial loads, and the backing bearing supports the axial loads. The floating nature of the backing bearing allows the backing bearing to self-center on the ball portion of the ball stud and move with the ball stud when radial loads are applied. That is, the ball stud and the backing bearing move together until the stud makes contact with the radial ring at the equator. This keeps the ball stud from trying to walk up the spherical radius of the backing bearing, thereby maintaining a large area of contact between the ball portion and the backing bearing at all times. The large area of contact between the ball portion and the backing bearing reduces wear in the ball stud and the backing bearing, thereby improving the operating life of the socket assembly as compared to other known socket assemblies.

According to another aspect of the present invention, the third bearing surface of the exit bearing is biased against the outer surface of the ball stud.

According to yet another aspect of the present invention, a dust boot is sealed against the housing and the shank portion of the ball stud, and the dust boot includes a spring which is at least partially embedded within a rubber body for biasing the third bearing surface of the exit bearing against the outer surface of the ball portion of the ball stud.

According to still another aspect of the present invention, the housing presents a radially inwardly extending lip at the open second end for trapping the exit bearing, boot and cover plate in the inner bore.

According to a further aspect of the present invention, the first bearing surface, second bearing surface and third bearing surface all present a plurality of lubricant grooves for distributing a lubricant throughout said inner bore of said housing.

According to yet a further aspect of the present invention, the housing presents a shoulder that faces towards the open second end of the housing, and the radial ring abuts the shoulder.

According to still a further aspect of the present invention, the spring is a Belleville washer.

According to another aspect of the present invention, the socket assembly further includes a thrust washer which is positioned between the wall of the housing and the backing bearing.

According to yet another aspect of the present invention, the thrust washer or the backing bearing presents at least one lubricant channel for conveying a lubricant between the thrust washer and the backing bearing and outer circumference of the backing bearing and inner circumference of the bore of the housing.

Another aspect of the present invention is a method of making a socket assembly. The method includes the step of preparing a housing with an inner bore which extends from a wall at a generally closed first end to an open second end. The method continues with the step of inserting a backing bearing with a curved first bearing surface into the inner bore of the housing such that the backing bearing is movable in a radial direction within the inner bore relative to the housing. The method proceeds with the step of inserting a ball portion of a ball stud into the inner bore of the housing and wherein the ball stud has a shank portion which extends from the ball portion out of the inner bore through the open second end of the housing and wherein a curved outer surface of the ball portion is in sliding contact with the first bearing surface of the backing bearing. The method proceeds with the step of inserting a radial ring with a second bearing surface into the inner bore of the housing with the second bearing surface being in sliding contact with an equator of the ball portion of the ball stud. The method continues with the step of inserting an exit bearing with a curved third bearing surface into the inner bore of the housing such that the third bearing surface is brought into sliding contact with the curved outer surface of the ball portion of the ball stud.

According to another aspect of the present invention, the method further includes the step of deforming the housing adjacent the open second end of the inner bore to trap the exit bearing in the inner bore.

According to yet another aspect of the present invention, the step of deforming the housing is further defined as swaging the housing.

According to still another aspect of the present invention the method further includes the step of sealing a dust boot against the shank and the housing wherein the swaging of the housing traps one end of the dust boot between a cover plate or the inwardly extending radial lip of the housing and an upper surface of the exit bearing.

According to a further aspect of the present invention, the dust boot includes a spring which is at least partially embedded in a rubber body and wherein the spring biases the third bearing surface of the exit bearing against the outer surface of the ball portion of the ball stud. According to yet a further aspect of the present invention, the method further includes the step of injecting a lubricant into the inner bore of the housing.

According to yet a further aspect of the present invention, the method further includes the step of inserting a thrust washer into the inner bore of the housing before the step of inserting the backing bearing into the inner bore of the housing.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
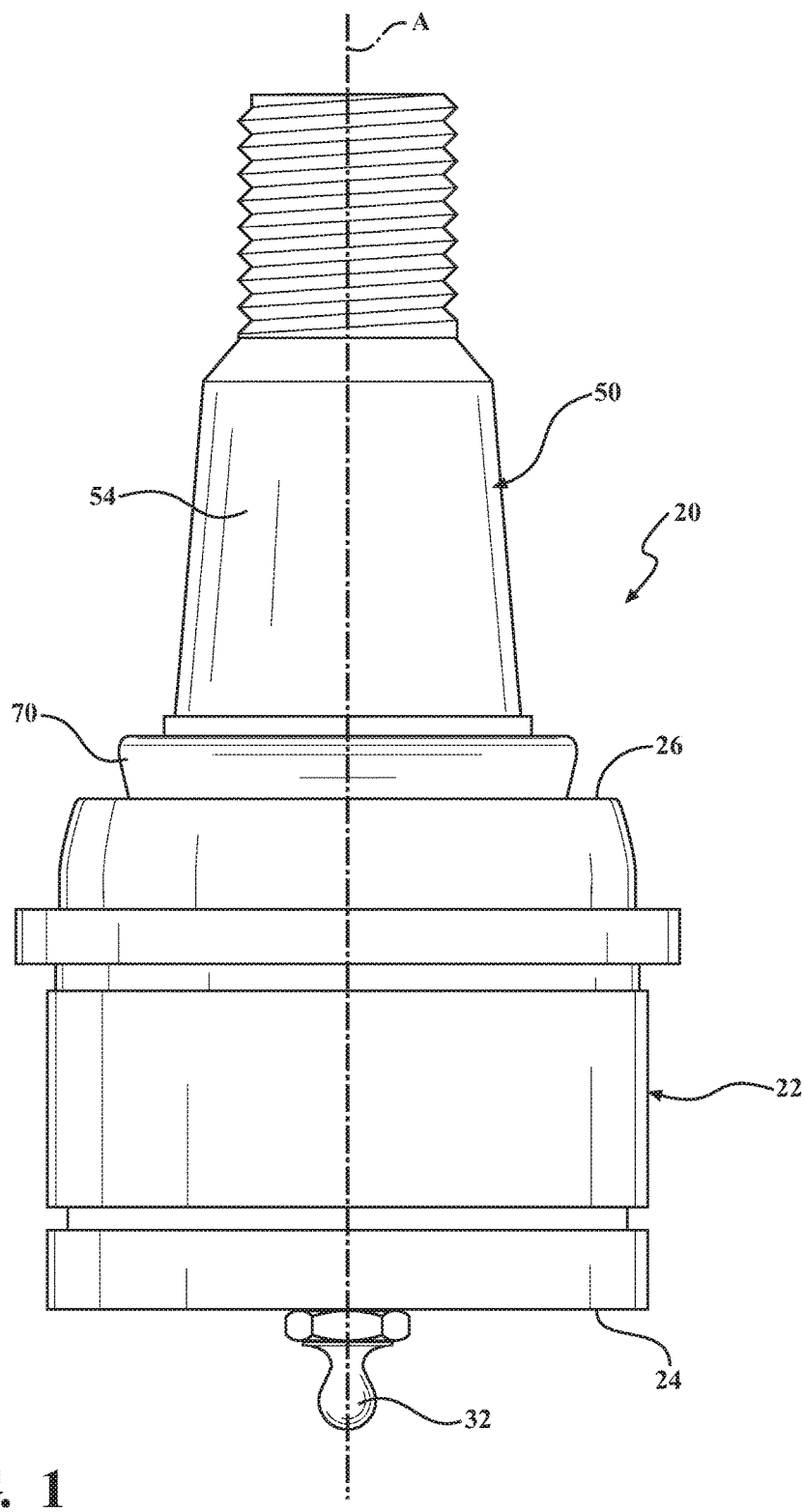
FIG. 1 is a perspective view of an exemplary embodiment of a socket assembly constructed according to an aspect of the present invention.
Figure 2:
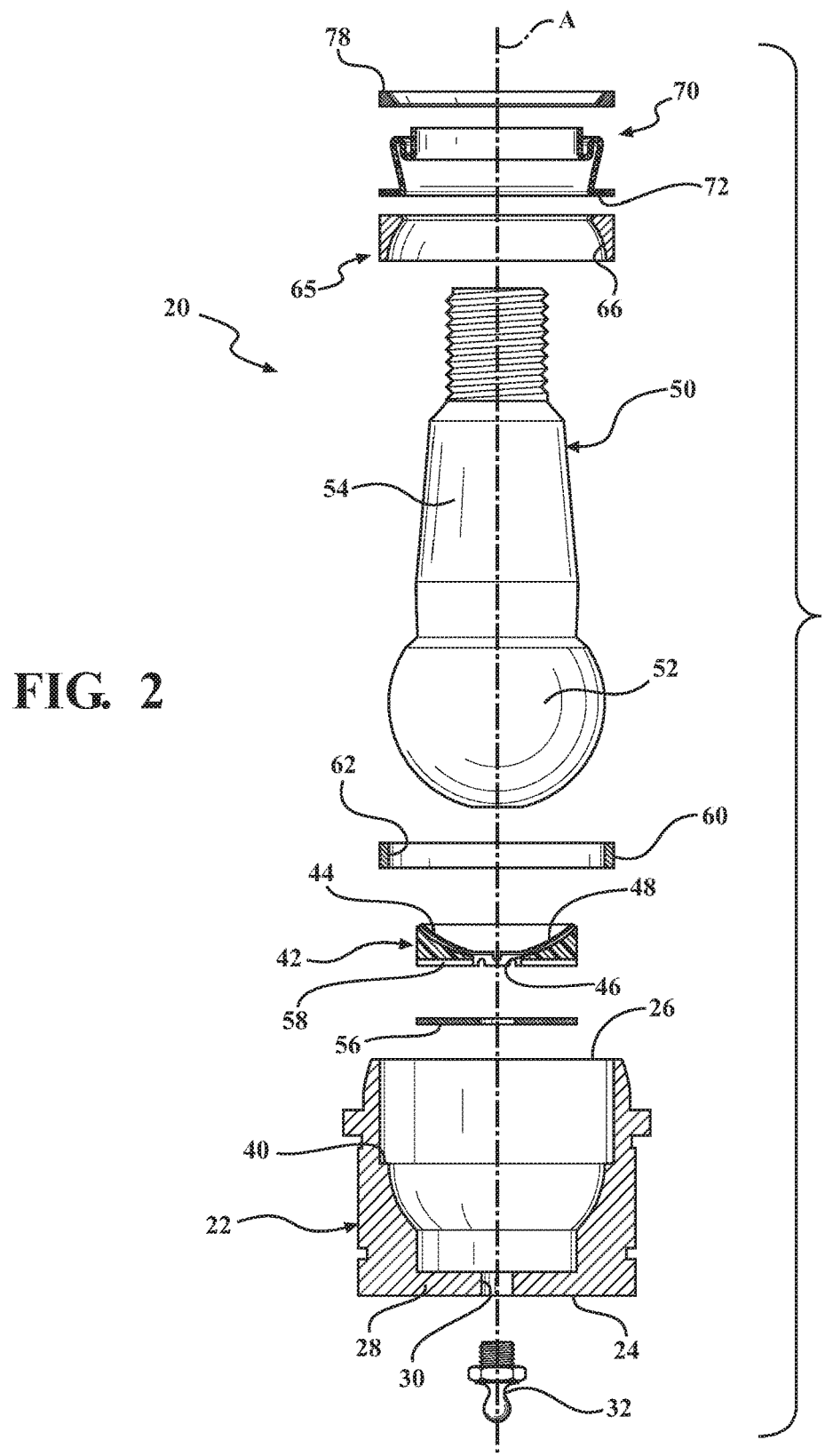
FIG. 2 is an exploded and cross-sectional view of the socket assembly of FIG. 1.
Figure 3:
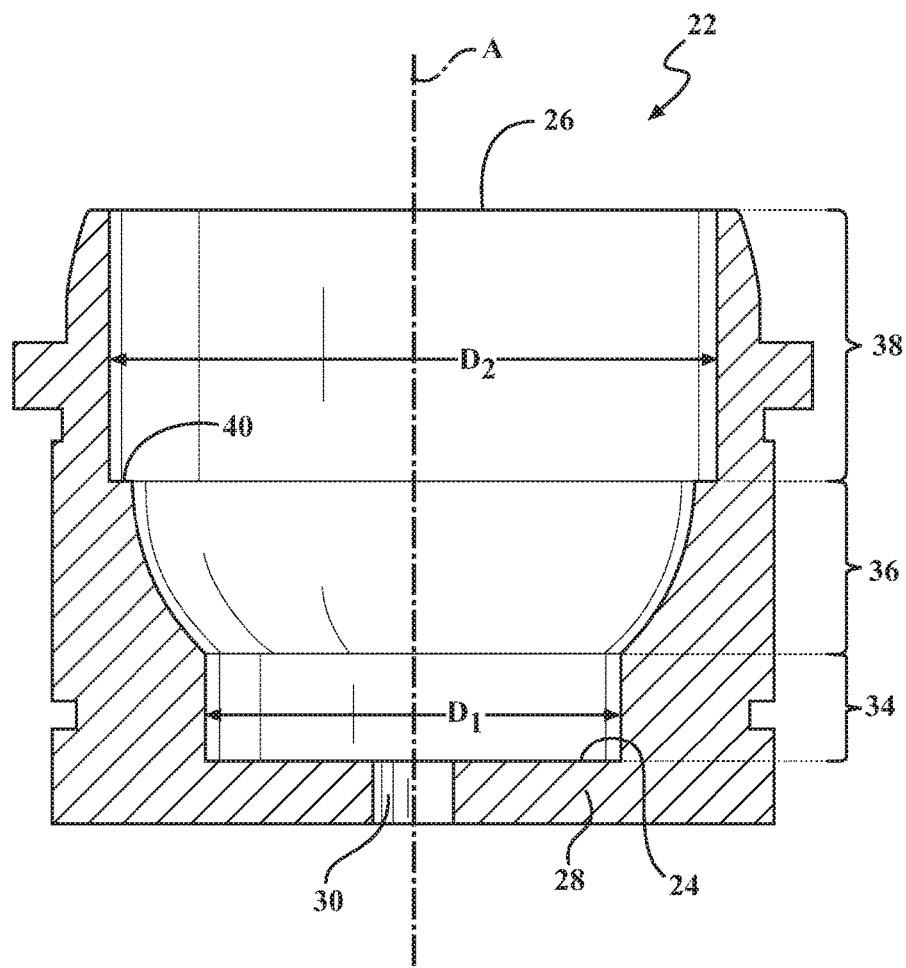
FIG. 3 is a cross-sectional view of a housing of the socket assembly of FIG. 1.
Figure 4:
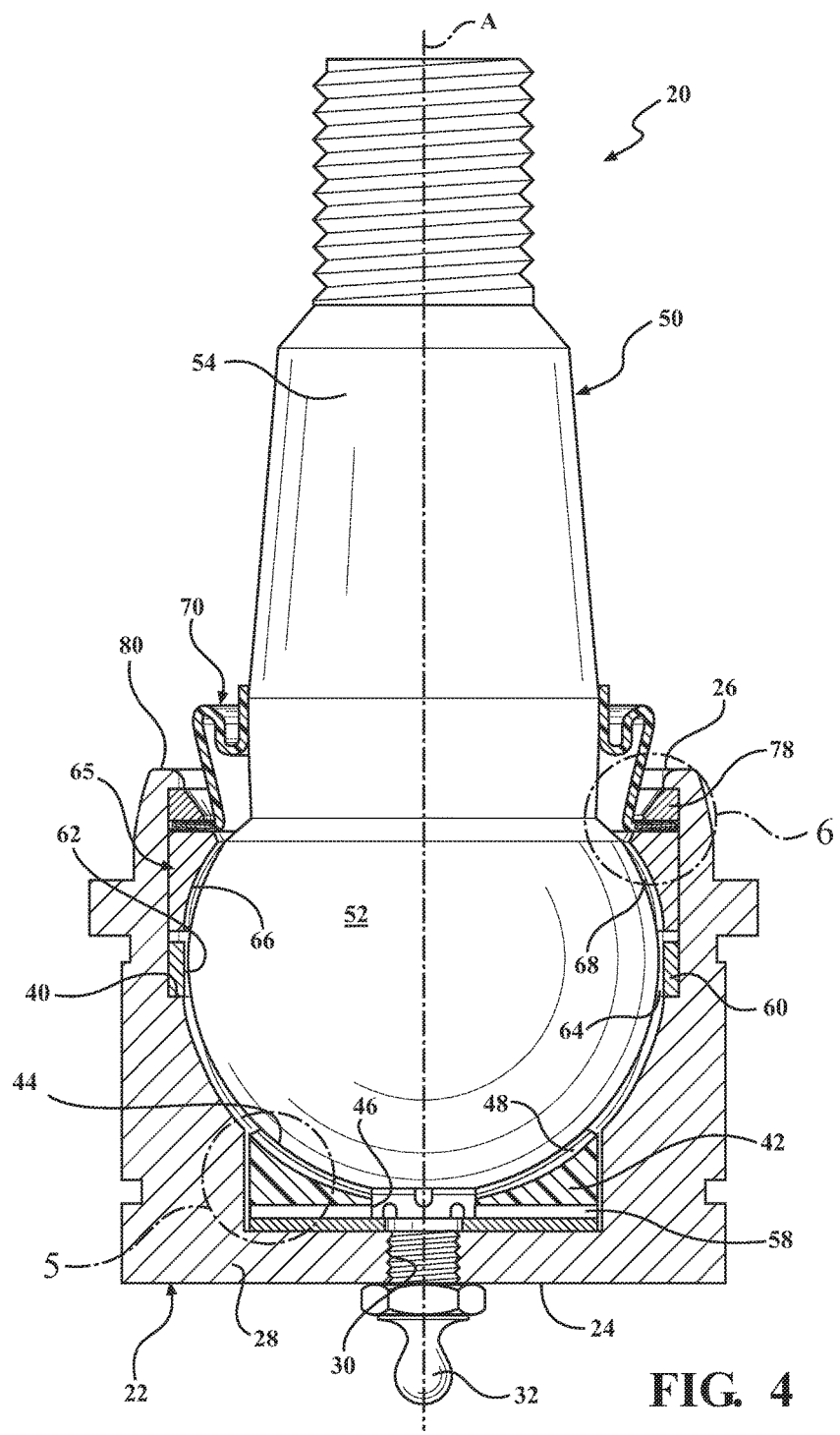
FIG. 4 is a cross-sectional view of the socket assembly of FIG. 1.

Referring to the Figures, wherein like numerals indicate corresponding parts throughout the several views, an exemplary embodiment of an improved socket assembly 20 (specifically, a ball joint assembly) is generally shown in FIGS. 1-5. In the exemplary embodiment, the socket assembly 20 is configured for joining a control arm (not shown) or axle (not shown) with a knuckle (not shown) of a vehicle suspension assembly. However, it should be appreciated that the socket assembly 20 could find uses in tie rod ends or in a wide range of automotive and non-automotive applications.

The socket assembly 20 includes a housing 22 with an inner bore that extends along an axis A from a closed first end 24 to an open second end 26. At the closed first end 24, the housing 22 presents a lower wall 28 with a lubricant opening 30 that receives a grease fitting 32 (also known as a zerk fitting) for conveying a lubricant, such as grease, into the inner bore to initially lubricate the components of the socket assembly 20 and to re-lubricate the socket assembly 20 as part of routine maintenance. The housing 22 is preferably made of a metal, such as steel or a steel alloy, and may be shaped through any suitable process or combination of processes including, for example, forging, casting, machining from a billet, etc. In the exemplary embodiment, the housing 22 is a cartridge for press-fitting into an opening in the control arm. However, the housing could alternately be integrally formed with another component, e.g., a control arm or a tie rod end.

The inner bore of the housing 22 has a progressively increasing diameter from the closed first end 24 to the open second end 26. Specifically, the inner bore has a first portion 34 with a generally constant first diameter $D_1$ adjacent the closed first end 24, a second portion 36 with an increasing diameter and a third portion 38 with a generally constant second diameter $D_2$ adjacent the open second end 26. As shown, the second diameter $D_2$ of the third portion 38 is greater than the first diameter $D_1$ of the first portion 34. An inner wall of the housing 22 at the second portion 36 of the inner bore is curved to increase the diameter of the second portion 36 in an axial direction towards the open second end 26. Between the second and third portions 36, 38 of the inner bore, the housing 22 presents a shoulder 40 which faces towards the open second end 26.

A backing bearing 42 is received in the first portion 34 of the inner bore and has a semi-spherically curved first bearing surface 44 which faces axially towards the second open end 26. The backing bearing 42 has an outer surface with an outer diameter which is less than the first diameter $D_1$ of the first portion 34 to present a gap (shown in FIG. 5) between the outer surface of the backing bearing 42 and an inner surface of the housing 22. As such, the backing bearing 42 is allowed to float in a radial direction in the first portion 34 of the inner bore within the limits established by the gap. The backing bearing 42 also includes a lubricant opening 46 which is aligned with the lubricant opening 30 of the lower wall 28 of the housing 22. The first bearing surface 44 of the exemplary embodiment is provided with a plurality of first grooves 48 formed thereon for distributing a lubricant from the lubricant opening 46 into the second portion 36 of the inner bore.

Figure 5:
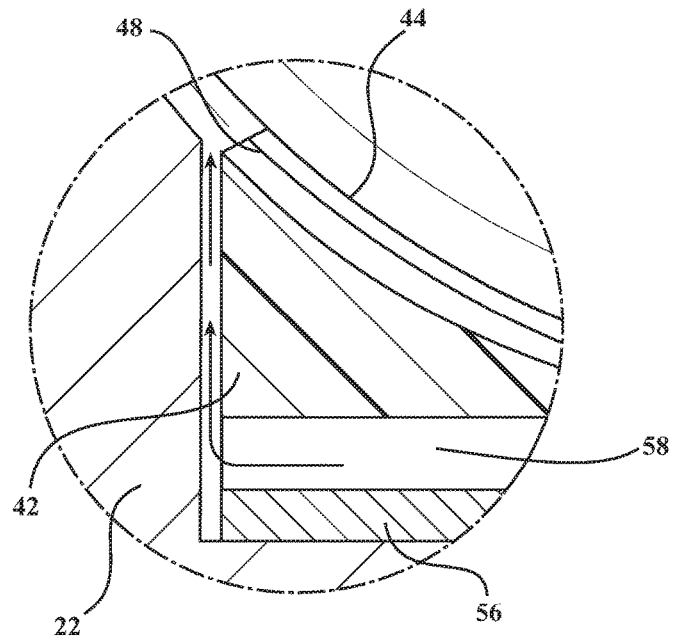
FIG. 5 is an enlarged view of a portion of FIG. 4.
Figure 6:
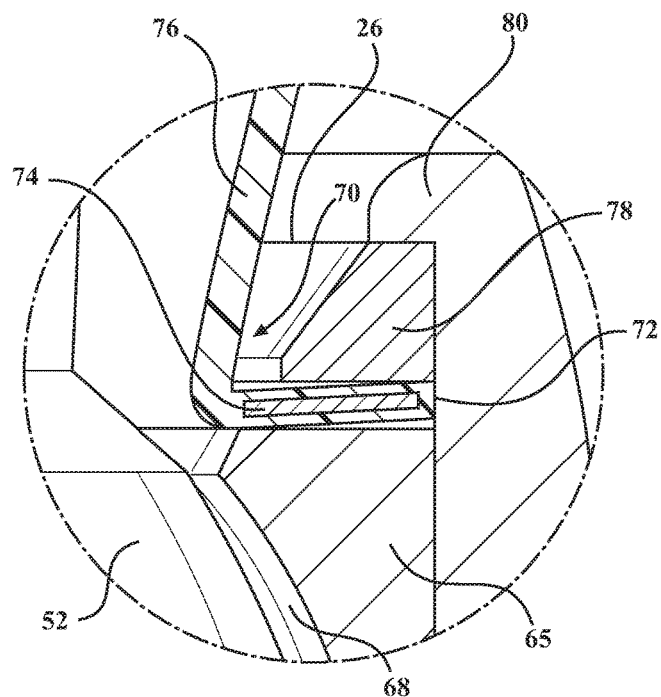
FIG. 6 is another enlarged view of a portion of FIG. 4.
Figure 7:
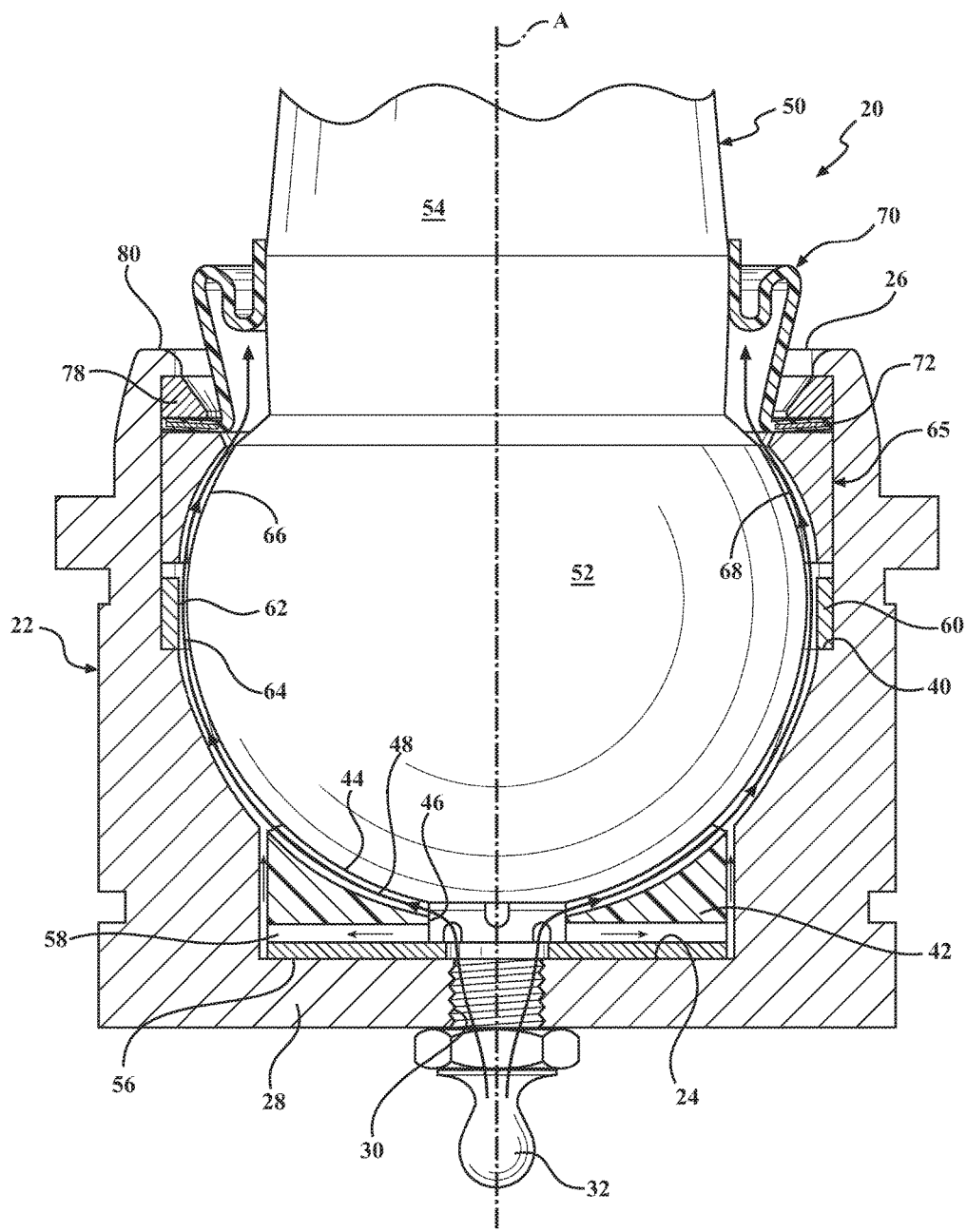
FIG. 7 is a cross-sectional view of the socket assembly of FIG. 1 and illustrating a flow path for grease within an interior of the socket assembly.

The socket assembly 20 further includes a ball stud 50 which is partially received in the inner bore of the housing 22. Specifically, the ball stud 50 includes a ball portion 52 that is fully disposed in the inner bore and a shank portion 54 which projects out of the inner bore through the open second end 26. The shank portion 54 extends from the ball portion 52 to a distal end which is threaded for receiving a nut to connect the shank portion 54 with another component, e.g., a knuckle. The ball portion 52 of the ball stud 50 has a generally semi-spherically curved outer surface which has a similar radius of curvature to the first bearing surface 44 of the backing bearing 42. The outer surface of the ball portion 52 is in sliding contact with the first bearing surface 44 to allow the ball stud 50 to rotate and pivot relative to the backing bearing 42 and the housing 22 during operation of the suspension assembly. The backing bearing 42 is preferably made of metal, such as steel or a steel alloy. As shown in FIG. 5, the lubrication channels 58 also allow lubricant to flow into the gap between the backing bearing 42 and the first portion 34 of the inner bore of the housing 22 from which the lubricant is able to enter the second portion 36 of the inner bore.

A thrust washer 56 is positioned in the first portion 34 of the inner bore between the backing bearing 42 and the lower wall 28 of the housing 22 for allowing radial movement of the backing bearing 42 relative to the housing 22. In the exemplary embodiment, a lower surface of the backing bearing 42 opposite of the first bearing surface 44 presents a plurality of lubrication channels 58 for conveying the lubricant between the backing bearing 42 and the thrust washer 56 to reduce friction between the backing bearing 42 and the thrust washer 56.

The socket assembly 20 further includes a radial ring 60 which is positioned in the third portion 38 of the inner bore and abuts the shoulder 40 of the housing 22. The radial ring 60 is a separate piece from the backing bearing 42 and is spaced axially therefrom by a gap in the second portion 36 of the inner bore. The radial ring 60 is generally annular in shape, and a radially inwardly facing surface of the radial ring 60 is a second bearing surface 62 which is in sliding contact with an equator of the ball portion 52 of the ball stud 50. The second bearing surface 62 may either be semi-spherically curved or it may be generally linear as viewed in cross-section. In the exemplary embodiment, the second bearing surface 62 is provided with a plurality of second lubrication grooves 64 for distributing lubricant around the surface-to-surface contact area between the second bearing surface 62 and the outer surface of the ball portion 52 of the ball stud 50 conveying lubricant in the inner bore axially across the radial ring 60. In the second portion 36 of the inner bore, the gap between the backing bearing 42 and the radial ring 60 acts as a lubrication reservoir which holds the lubricant.

An exit bearing 65 is received in the third portion 38 of the inner bore and has a third bearing surface 66 which has a similar radius of curvature as the ball portion 52 and is in sliding contact with the outer surface of the ball portion 52 of the ball stud 50. The exit bearing 65 has a generally flat or planar top surface which faces towards the open second end 26 of the inner bore. In the exemplary embodiment, the third bearing surface 66 is provided with a plurality of third lubrication grooves 68 for distributing the lubricant around the surface-to-surface contact between the third bearing surface 66 and the ball portion 52 of the ball stud 50 and for conveying the lubricant in the inner bore of the housing 22 in an axial direction across the exit bearing 65.

During operation of the suspension assembly, the radial ring 60 transfers all or substantially all of the radial forces between the ball stud 50 and the housing 22 while the backing and exit bearings 42, 65 transfer all or substantially all of the axial forces between the ball stud 50 and the housing 22.

The socket assembly 20 further includes a dust boot 70 which is sealed against the housing 22 and against the shank portion 54 of the ball stud 50 for maintaining the lubricant in the interior of the socket assembly 20 and for keeping contaminants outside of the socket assembly 20. The dust boot 70 includes a first boot end which presents a radially outwardly extending flange 72 with a spring in the form of a Belleville washer 74 that is embedded within a boot body 76 at the radially outwardly extending flange 72. The boot body 76 is made of a flexible sealing material, such as rubber or a plastic material. The radially outwardly extending flange 72 is in surface to surface contact with the top surface of the exit bearing 65.

A cover plate 78 is positioned at an opposite side of the radially outwardly extending flange 72 of the dust boot 70. The housing 22 has a radially inwardly extending lip 80 which traps the cover plate 78 and the radially outwardly extending flange 72 of the dust boot 70 between the radially inwardly extending lip 80 and the exit bearing 65. This also has the effect of allowing the Belleville washer 74 in the dust boot 70 to impart a preload force against the exit bearing 65 to bias the third bearing surface 66 of the exit bearing 65 against the outer surface of the ball portion 52 of the ball stud 50. The radially inwardly extending lip 80 is preferably formed into the housing 22 by swaging the housing 22 at the open second end 26 of the inner bore.

Another aspect of the present invention is a method of making a socket assembly 20, such as the exemplary socket assembly shown in FIGS. 1-5. The method includes the step of preparing a housing 22 with an inner bore that extends from a lower wall 28 at a generally closed first end 24 to an open second end 26. The method continues with the step of inserting a thrust washer 56 into the inner bore. The method proceeds with the step of inserting a backing bearing 42 into the inner bore such that the backing bearing 42 is movable in a radial direction within the inner bore and such that the backing bearing 42 is slidable relative to the housing 22 on the thrust washer 56. Preferably, a lower surface of the backing bearing 42 or an upper surface of the thrust washer 56 is provided with one or more lubrication channels 58 for distributing the lubricant across the interface between the backing bearing 42 and the thrust washer 56. The method continues with the step of inserting a ball portion 52 of a ball stud 50 into the inner bore of the housing 22. The ball stud 50 also has a shank portion 54 which extends from the ball portion 52 out of the inner bore through the open second end 26 of the housing 22 and wherein a curved outer surface of the ball portion 52 is in sliding contact with the first bearing surface 44 of the backing bearing 42. The method proceeds with the step of inserting a radial ring 60 with a second bearing surface 62 into the inner bore of the housing 22 such that the second bearing surface 62 of the radial ring 60 is in sliding contact with the equator of the ball portion 52 of the ball stud 50. The method continues with the step of inserting an exit bearing 65 with a curved third bearing surface 66 into the inner bore of the housing 22 such that the third bearing surface 66 is brought into sliding contact with the curved outer surface of the ball portion 52 of the ball stud 50. The method proceeds with the steps of engaging a radially outwardly extending flange 72 of a dust boot 70 with a top surface of the exit bearing 65 and inserting a cover plate 78 into the inner bore. The method continues with the step of deforming, such as through swaging, the housing 22 at the open second end 26 to trap the radially outwardly extending flange 72 and the cover plate 78 between a radially inwardly extending lip 80 of the housing 22 and the exit bearing 65. Preferably, the dust boot 70 is provided with a spring, such as a Belleville washer 74, at least partially embedded in the radially outwardly extending flange 72 of the dust boot 70 such that the Belleville washer 74 imparts a biasing force against the exit bearing 65 to bias the third bearing surface 66 against the curved outer surface of the ball portion 52 of the ball stud 50. The method continues with the step of injecting a lubricant into the inner bore of the housing 22.

It should be appreciated that the use of the terms "upper" and "lower" herein is in reference to the orientation of the socket assembly 20 in the Figures and is not considered to require a particular orientation or otherwise be limiting.

Obviously, many modifications and variations of the present invention are possible in light of the above teachings and may be practiced otherwise than as specifically described while within the scope of the appended claims.

What is claimed is:
1. A socket assembly, comprising:
a housing with an inner bore that extends along an axis from a wall at a generally closed first end to an open second end;

a ball stud having a ball portion which is received in said inner bore of said housing and a shank portion which projects out of said inner bore through said open second end;

a backing bearing disposed in said inner bore with an annular gap surrounding said backing bearing such that said backing bearing is movable in a radial direction relative to said housing and said backing bearing presenting a curved first bearing surface in sliding contact with an outer surface of said ball portion of said ball stud;

a radial ring having an annular shape disposed in said inner bore of said housing and presenting a second bearing surface that is in sliding contact with an equator of said ball portion;

an exit bearing made as a separate piece from said radial ring and having a curved third bearing surface in sliding contact with an opposite hemisphere of said ball portion from said first bearing surface;

wherein said exit bearing is spaced from said radial ring in an axial direction by a gap which surrounds said ball portion of said ball stud;

wherein said housing presents a shoulder that faces towards said open second end of said housing and wherein said radial ring abuts said shoulder; and said backing bearing having a cylindrical outer surface with an outer diameter that is less than a diameter of said second bearing surface of said radial ring.

2. The socket assembly as set forth in claim 1 wherein said third bearing surface of said exit bearing is biased against said outer surface of said ball portion of said ball stud.

3. The socket assembly as set forth in claim 2 further including a dust boot which is sealed against said housing and said shank portion of said ball stud and which includes a spring at least partially embedded within a rubber body for biasing said third bearing surface of said exit bearing against said outer surface of said ball portion of said ball stud.

4. The socket assembly as set forth in claim 3 wherein said spring is a Belleville washer.

5. The socket assembly as set forth in claim 1 wherein said housing presents a radially inwardly extending lip at said open second end for trapping said exit bearing in said inner bore of said housing.

6. The socket assembly as set forth in claim 1 wherein said first bearing surface, said second bearing surface, and said third bearing surface all present a plurality of lubricant grooves for distributing a lubricant throughout said inner bore of said housing.

7. The socket assembly as set forth in claim 1 further including a thrust washer disposed between said wall of said housing and said backing bearing.

8. The socket assembly as set forth in claim 7 wherein said thrust washer or said backing bearing presents at least one lubricant channel for conveying a lubricant between said thrust washer and said backing bearing.

9. A method of making a socket assembly, comprising the steps of:

preparing a housing with an inner bore which extends from a wall at a generally closed first end to an open second end;

inserting a backing bearing with a curved first bearing surface into the inner bore of the housing such that an annular gap surrounds the backing bearing to allow the backing bearing to move in a radial direction relative to said housing within the inner bore;

inserting a ball portion of a ball stud into the inner bore of the housing and wherein the ball stud has a shank portion which extends from the ball portion out of the inner bore through the open second end of the housing and wherein a curved outer surface of the ball portion is in sliding contact with the first bearing surface of the backing bearing;

inserting a radial ring with a second bearing surface into the inner bore of the housing with the second bearing surface being in sliding contact with an equator of the ball portion of the ball stud such that the radial ring abuts a shoulder of the housing;

inserting an exit bearing with a curved third bearing surface into the inner bore of the housing such that the third bearing surface is brought into sliding contact with the curved outer surface of the ball portion of the ball stud and such that the exit bearing is spaced from the radial ring in an axial direction by a gap which surrounds the ball portion of the ball stud; and wherein the backing bearing has a cylindrical outer surface which has an outer diameter that is less than a diameter of the second bearing surface of the radial ring.

10. The method as set forth in claim 9 further including the step of deforming the housing adjacent the open second end of the inner bore to trap the exit bearing in the inner bore.

11. The method as set forth in claim 10 wherein the step of deforming the housing is further defined as swaging the housing.

12. The method as set forth in claim 11 further including the step of sealing a dust boot against the housing and against the shank portion of the ball stud and wherein the swaging of the housing traps one end of the dust boot between a radially inwardly extending lip on the housing and an upper surface of the exit bearing.

13. The method as set forth in claim 12 wherein the dust boot includes a spring at least partially embedded in a rubber body and wherein the spring biases the third bearing surface of the exit bearing against the outer surface of the ball portion of the ball stud.

14. The method as set forth in claim 9 further including the step of injecting a lubricant into the inner bore of the housing.

15. The method as set forth in claim 9 further including the step of inserting a thrust washer into the inner bore of the housing before the step of inserting the backing bearing into the inner bore of the housing.

16. The method as set forth in claim 9 wherein said backing bearing is made as a monolithic piece of a substantially rigid material.

17. The method as set forth in claim 16 wherein said substantially rigid material of said backing bearing is a metal.

* * * * *